US009266062B2

(12) United States Patent
Guo et al.

(10) Patent No.: US 9,266,062 B2
(45) Date of Patent: Feb. 23, 2016

(54) METHOD OF REMOVING SULFUR OXIDES AND NITROGEN OXIDES IN THE FLUE GAS

(75) Inventors: Dawei Guo, Beijing (CN); Jiushun Zhang, Beijing (CN); Anguo Mao, Beijing (CN); Chaogang Xie, Beijing (CN); Jun Fu, Beijing (CN); Wei Wang, Beijing (CN); Jingchuan Yu, Beijing (CN)

(73) Assignee: China Petroleum & Chemical Corporation, Beijing (CN)

( * ) Notice: Subject to any disclaimer, the term of this patent is extended or adjusted under 35 U.S.C. 154(b) by 0 days.

(21) Appl. No.: 14/235,518

(22) PCT Filed: Jul. 27, 2012

(86) PCT No.: PCT/CN2012/001003
§ 371 (c)(1),
(2), (4) Date: Apr. 11, 2014

(87) PCT Pub. No.: WO2013/013506
PCT Pub. Date: Jan. 31, 2013

(65) Prior Publication Data
US 2014/0335005 A1    Nov. 13, 2014

(30) Foreign Application Priority Data

Jul. 28, 2011  (CN) .......................... 2011 1 0213203
Jul. 28, 2011  (CN) .......................... 2011 1 0213226

(51) Int. Cl.
*B01D 53/86* (2006.01)
*B01D 53/50* (2006.01)
(Continued)

(52) U.S. Cl.
CPC ............. *B01D 53/8637* (2013.01); *B01J 23/10* (2013.01); *B01J 23/63* (2013.01); *B01J 23/83* (2013.01); *C01B 17/0404* (2013.01); *C01B 17/0434* (2013.01); *C01B 17/0473* (2013.01); *B01D 2251/20* (2013.01); *B01D 2251/202* (2013.01); *B01D 2251/204* (2013.01);
(Continued)

(58) Field of Classification Search
CPC ..................................................... B01D 53/86
USPC ............... 423/239.1, 244.01, 244.02, 244.06, 423/244.1, 567.1; 422/168, 169, 170, 177
See application file for complete search history.

(56) References Cited

U.S. PATENT DOCUMENTS 4,609,537 A *  9/1986  Tolpin et al. ............. 423/244.02
4,692,318 A *  9/1987  Tolpin et al. ............... 423/239.1
(Continued)

FOREIGN PATENT DOCUMENTS

CN      1275435 A    12/2000
CN      1436273 A     8/2003
(Continued)

OTHER PUBLICATIONS

Inernational Search Report of International Patent Application No. PCT/CN2012/001003, dated Nov. 15, 2012.
(Continued)

*Primary Examiner* — Timothy Vanoy
(74) *Attorney, Agent, or Firm* — Finnegan, Henderson, Farabow, Garrett & Dunner, L.L.P.

(57) ABSTRACT

The present invention discloses a method of removing sulfur oxides and/or nitrogen oxides in a regeneration flue gas emitted from a regenerator of a catalytic cracking plant and recovering the elemental sulfur and an apparatus therefor.

19 Claims, 1 Drawing Sheet

(51) Int. Cl.
*B01D 53/56* (2006.01)
*B01J 23/10* (2006.01)
*B01J 23/63* (2006.01)
*B01J 23/83* (2006.01)
*C01B 17/04* (2006.01)
*C10G 11/18* (2006.01)

(52) U.S. Cl.
CPC ...... *B01D 2251/208* (2013.01); *B01D 2255/10* (2013.01); *B01D 2255/1021* (2013.01); *B01D 2255/206* (2013.01); *B01D 2255/207* (2013.01); *B01D 2255/2063* (2013.01); *B01D 2255/2065* (2013.01); *B01D 2255/2092* (2013.01); *B01D 2255/20715* (2013.01); *B01D 2255/20746* (2013.01); *B01D 2255/20769* (2013.01); *B01D 2255/904* (2013.01); *B01D 2255/9022* (2013.01); *C10G 11/182* (2013.01)

(56) References Cited

U.S. PATENT DOCUMENTS

| | | | | |
|---|---|---|---|---|
| 4,851,374 | A | * | 7/1989 | Yan et al. .......................... 502/42 |
| 5,011,592 | A | * | 4/1991 | Owen et al. ................... 208/113 |
| 5,547,648 | A | | 8/1996 | Buchanan |
| 5,853,684 | A | * | 12/1998 | Fang et al. ................. 423/244.1 |
| 2004/0076575 | A1 | | 4/2004 | Alvarez, Jr. et al. |
| 2006/0233688 | A1 | | 10/2006 | Barckholtz et al. |
| 2009/0004080 | A1 | | 1/2009 | Chow et al. |

FOREIGN PATENT DOCUMENTS

| | | |
|---|---|---|
| CN | 1817418 A | 8/2006 |
| CN | 101036853 A | 9/2007 |
| CN | 101209391 A | 7/2008 |

OTHER PUBLICATIONS

Deng, Geng-feng et al., "Study on the Catalytic Reduction of $SO_2$ in the Flue Gas to Sulfur with Coal Gas," Journal of Jiangxi University of Science and Technology, vol. 31, No. 1, pp. 32-35 (2012).

Llang, Yong et al., "Researches in catalytic reduction of sulfur dioxide in flue gas to elemental sulfur," Industrial Catalysis, vol. 15, No. 5, pp. 55-59 (2007).

Tarasov, A.V. et al., Recovery of elemental sulfur from the smelting plant's flue gas, pp. 12-14 (2001).

Wang, Xuehai et al., "Chemical Industry and Engineering Progress," Chemical Industry and Engineering Progress, pp. 1209-1214; 1240 (2010).

Zhou, Jin-hui et al., "The Research Progress on Catalytic Reduction of $SO_2$ to Elemental Sulfur," Industrial Safety and Environmental Protection, pp. 35-37 (2007).

Yang, Shuxian, "Analysis Study of Sulfur Distribution in Crude Oil Processing," Corrosion & Protection in petrochemical Industry, vol. 22, No. 3, pp. (2005).

Supplementary European Search report, Application No. EP 12 81 6884, dated Feb. 23, 2015.

* cited by examiner

METHOD OF REMOVING SULFUR OXIDES AND NITROGEN OXIDES IN THE FLUE GAS

CROSS REFERENCE TO RELATED APPLICATIONS

This application is a U.S. national phase application based on PCT/CN2012/001003, filed Jul. 27, 2012, which claims the priority of Chinese Application Nos. 201110213203.5, filed Jul. 28, 2011, and 201110213226.6, filed Jul. 28, 2011, the content of all of which is incorporated by reference herein in their entirety.

FIELD OF THE INVENTION

The present invention relates to a method of treating a waste gas. More specifically, the present invention relates to a method of removing sulfur oxides and/or nitrogen oxides in a regeneration flue gas emitted from a regenerator of a catalytic cracking plant and recovering an elemental sulfur.

BACKGROUND OF THE INVENTION

A catalytic cracking catalyst is recycled between a reactor and a regenerator. Generally, upon leaving the reactor, the catalyst contains about 3-10 wt % of coke. The catalyst should be burned with oxygen in air in the regenerator to remove the deposited coke to recover its catalytic activity. The coke deposited in/on the catalyst is mainly a condensation reaction product, which is substantially composed of carbon and hydrogen. In case that the cracking feedstock contains sulfur and nitrogen, the coke also contains sulfur and nitrogen. The coked catalyst is regenerated with oxygen to produce $CO_2$, CO and $H_2O$, and the regeneration flue gas further contains SOx ($SO_2$, $SO_3$) and NOx (NO, $NO_2$). The regeneration reaction is an exothermal reaction and has a large thermal effect that is sufficient to provide a heat quantity required by the heat balance of the catalytic cracking plant. The flue gas leaving the regenerator of the catalytic cracking plant has a temperature of 620-690° C. and a pressure of 0.1-0.25 MPa, and therefore has a higher energy grade. Generally, in order to facilitate recovering and reusing the energy of the flue gas, a flue gas turbine expander is used to produce electricity, then a waste heat boiler is used to produce steam, and finally the blowdown gas has a temperature of 170-250° C. and a pressure of a very small positive pressure or even a negative pressure. If the regenerator is operated in an oxygen-deficient manner, the content of carbon monoxide will be relatively higher, in order to avoid the tail gas combustion, a carbon monoxide combustion aid is needed and an additional oxygen is supplied so that carbon monoxide can be converted to carbon dioxide.

In the other hand, the hydrocarbon feedstock for the catalytic cracking plant is subjected to a cracking reaction and a fractionation to produce a variety of fractions, wherein the gaseous fractions include a dry gas fraction. The dry gas contains $H_1$, small molecule hydrocarbon and non-hydrocarbon compounds, $H_2S$ and the like. Generally, the dry gas should be subjected to an $H_2S$ removal step before it is utilized. The removed $H_2S$ is further passed through a means such as Claus to be converted to an elemental sulfur (the elemental sulfur has a boiling point of 445° C. and a melting point of 113° C.) and the recovery is eventually completed.

The sulfur carried from the feedstock into the catalytic cracking plant is present in an oxidation state in the flue gas and in a reduction state in the dry gas. According to the existing technologies, the removal of sulfur oxides in the flue gas and the removal of $H_2S$ in the dry gas are separately conducted. The technology of simultaneously treating the flue gas and the dry gas is seldom, if not never, reported up to now.

SUMMARY OF THE INVENTION

The technical problem to be solved by the present invention is to provide a method of removing sulfur oxides and nitrogen oxides in the catalytic cracking regeneration flue gas, and simultaneously producing an elemental sulfur.

Specifically, the present invention provides the following technical solutions:

Technical solution 1: A method of removing sulfur oxides and nitrogen oxides in a regeneration flue gas of a catalytic cracking regenerator, wherein said method comprises the following steps:
(1) a mid-temperature zone reactor and an optional high-temperature zone reactor are provided;
(2) a catalyst of a noble metal active component and a rare earth metal active component on an inorganic oxide support is loaded in the high-temperature zone reactor;
a catalyst of a rare earth metal active component and an optional transition metal active component on an inorganic oxide support is loaded in the mid-temperature zone reactor;
(3) the regeneration flue gas is sequentially passed through the optional high-temperature zone reactor and the mid-temperature zone reactor;
(4) a reductive gas is added to the optional high-temperature zone reactor and the mid-temperature zone reactor, wherein the reductive gas can enter the reactor(s) prior to, simultaneously with or posterior to the flue gas; and
(5) the flue gas and the reductive, gas are optionally reacted at 620-690° C. in the high-temperature zone reactor and the flue gas and the reductive gas are reacted at 500-650° C. in the mid-temperature zone reactor,
provided that if the high-temperature zone reactor is present, the reaction temperature in the mid-temperature zone reactor is lower than the reaction temperature in the high-temperature zone reactor.

Technical solution 2: The method of technical solution 1, wherein the mid-temperature zone reactor, a flue gas turbine expander and optionally the high-temperature zone reactor are provided in the step (1), the catalytic cracking regenerator, the high-temperature zone reactor, the flue gas turbine expander and the mid-temperature zone reactor, or the catalytic cracking regenerator, the mid-temperature zone reactor and the flue gas turbine expander are connected in the above mentioned order, after that a waste heat boiler is optionally connected, and then a cooler is optionally connected.

Technical solution 3: The method of technical solution 1, wherein the catalyst of the noble metal active component and the rare earth metal active component on the inorganic oxide support is loaded in the high-temperature zone reactor, wherein said noble metal active component is one or more selected from the group consisting of Pt, Pd, Rh and Au, said rare earth metal active component is one or more selected from the group consisting of La, Ce and Pr, and said inorganic oxide support is one or more selected from the group consisting of $Al_2O_3$, $SiO_2$, $TiO_2$ and $ZrO_2$.

Technical solution 4: The method of technical solution 3, wherein based on the total weight of the catalyst, the content of the noble metal (as oxide) in said catalyst is 0.1 wt %-5 wt % and the content of the rare earth metal (as oxide) in said catalyst is 0.2 wt %-15 wt %.

Technical solution 5: The method of technical solution 1, wherein the catalyst of the rare earth metal active component and the optional transition metal active component on the inorganic oxide support is loaded in the mid-temperature zone reactor, wherein said rare earth metal is one or more selected from the group consisting of La, Ce and Pr, said transition metal is one or more selected from the group consisting of Fe, Co, Ni, Cu, Zn, Ti, Mo and W, said inorganic oxide support can be one or more of $Al_2O_3$, $SiO_2$, $TiO_2$, $ZrO_2$, $SnO_2$ and molecular sieve such as ZSM-5, HZSM-5, NaY, mordenite and the like, preferably one or more of $Al_2O_3$, $TiO_2$, $SiO_2$ and $ZrO_2$.

Technical solution 6: The method of technical solution 5, wherein based on the total weight of the catalyst, the content of the rare earth metal (as oxide) in said catalyst is 0.2 wt %-16 wt % and the content of the transition metal (as oxide) in said catalyst is 0.2 wt %-25 wt %.

Technical solution 7: The method of technical solution 1, wherein the high-temperature zone reactor is present, and the flue gas and the reductive gas are reacted at 500-550° C. in the mid-temperature zone reactor.

Technical solution 8: The method of technical solution 1, wherein the high-temperature zone reactor is absent, and the flue gas and the reductive as are reacted at 600-650° C. in the mid-temperature zone reactor.

Technical solution 9: The method of technical solution 1, wherein said reductive gas is one or more of hydrogen, hydrogen sulfide, carbon monoxide and small molecule hydrocarbon(s) having the carbon number of 5 or less.

Technical solution 10: The method of technical solution 1, wherein said reductive gas contains 0.01-90 vol % of hydrogen sulfide.

Technical solution 11: The method of technical solution 1, wherein said reductive gas comprises or is a/the dry gas fraction obtained from a catalytic cracking plant.

Technical solution 12: The method of technical solution 1, wherein the number of the mid-temperature zone reactor is one or more than one, wherein in the case that the number of the mid-temperature zone reactor is more than one, said reactors are connected in parallel; and/or the number of the high-temperature zone reactor is one or more than one, wherein in the case that the number of the high-temperature zone reactor is more than one, said reactors are connected in parallel.

Technical solution 13: The method of technical solution 2, wherein the waste heat boiler is present and a low-temperature zone reactor is disposed after the waste heat boiler and before the cooler, wherein the flue gas coming from the waste heat boiler and the reductive gas introduced into the low-temperature zone reactor are reacted at 150-280° C. in the presence of a catalyst, wherein said catalyst is one or more selected from alumina such as activated alumina, zirconia, titania and zinc oxide.

Technical solution 14: The method of technical solution 13, wherein a sulfur recovery device is disposed in said low-temperature zone reactor.

Technical solution 15: The method of technical solution 13, wherein said flue gas turbine expander has an inlet temperature of 630-680° C. and an outlet temperature of 520-550° C.; said waste heat boiler has an inlet temperature of 500-530° C. and an outlet temperature of 180-300° C.; and said cooler has an outlet temperature of 100-110° C.

Technical solution 16: The method of technical solution 13, wherein a liquid sulfur recovery device is disposed in or after the waste heat boiler; and a solid sulfur recovery device is disposed in the cooler.

Technical solution 17: An apparatus for removing sulfur oxides and nitrogen oxides in a regeneration flue gas of a catalytic cracking plant, wherein said catalytic cracking plant comprises a catalytic cracking reactor, a regenerator and a product separation system, wherein the regenerator has a flue gas outlet, and the product separation system has a dry gas outlet; wherein said apparatus comprises a mid-temperature zone reactor, an optional flue gas turbine expander and an optional high-temperature zone reactor, wherein a catalyst of a noble metal active component and a rare earth metal active component on an inorganic oxide support is loaded in the high-temperature zone reactor; wherein a catalyst of a rare earth metal active component and an optional transition metal active component on an inorganic oxide support is loaded in the mid-temperature zone reactor; in case that the high-temperature zone reactor is present, the flue gas outlet of the regenerator is connected to the high-temperature zone reactor, the inlet of the mid-temperature zone reactor is connected to the outlet of the high-temperature zone reactor; or in case that the flue gas turbine expander is present, the inlet of the mid-temperature zone reactor is connected to the outlet of the high-temperature zone reactor through the flue gas turbine expander;

in case that the high-temperature zone reactor is absent, the flue gas outlet of the regenerator is connected to the mid-temperature zone reactor, and in case that the flue gas turbine expander is present, the outlet of the mid-temperature zone reactor is connected to the flue gas turbine expander;

wherein the high-temperature zone reactor and the mid-temperature zone reactor respectively have one or more than one reductive gas inlets, wherein the flue gas outlet of the regenerator is connected through valve(s) to one or more than one reductive gas inlets of the high-temperature zone reactor or the mid-temperature zone reactor.

Technical solution 18: The apparatus of technical solution 17, wherein said apparatus further comprises a subsequently connected waste heat boiler and optionally a cooler following the waste heat boiler.

Technical solution 19: The apparatus of technical solution 17, wherein the number of the mid-temperature zone reactor is one or more than one, wherein in the case that the number of the mid-temperature zone reactor is more than one, said reactors are connected in parallel; and/or the number of the high-temperature zone reactor is one or more than one, wherein in the case that the number of the high-temperature zone reactor is more than one, said reactors are connected in parallel.

Technical solution 20: The apparatus of technical solution 17, wherein a low-temperature zone reactor is disposed after the waste heat boiler and before the optional cooler, said low-temperature zone reactor is loaded with one or more than one catalysts selected from the group consisting of alumina such as activated alumina, zirconia, titania and zinc oxide, and said low-temperature zone reactor has one or more reductive gas inlets.

Technical solution 21: The apparatus of technical solution 20, wherein a sulfur recovery device is disposed in said low-temperature zone reactor.

Technical solution 22: The apparatus of technical solution 18, wherein a liquid sulfur recovery device is disposed in or after the waste heat boiler; and a solid sulfur recovery device is disposed in the cooler.

The beneficial effect of the present invention (1) According to the technical solution of the present invention, in the procedure of treating a catalytic cracking flue gas, the catalytic reactor(s) is disposed in a mid- and/or high-temperature zone, wherein a reductive gas and a regeneration flue gas are introduced to the catalyst bed. Hydrogen, small molecule hydrocarbons and/or hydrogen sulfide in the reductive gas and carbon monoxide in the regeneration flue gas are contacted and reacted with sulfur oxides, nitrogen oxides and oxygen in the regeneration flue gas to produce an elemental sulfur. The resulting elemental sulfur is recovered in the subsequent procedure of recovering the energy in the flue gas mixture, Therefore the subsequent sulfur-removal of the sulfUr-containing flue gas can be omitted, and the procedure of treating the pollutants from the catalytic cracking plant can be simplified.

(2) According to the technical solution of the present invention, redox reactors for removing sulfur oxides and nitrogen oxides are disposed in the different temperature zones. The catalytic cracking regeneration flue gas and the reductive gas are subjected to the redox reaction along with the temperature of the catalytic cracking regeneration flue gas being continually decreased. Sulfur oxides, nitrogen oxides and oxygen in the regeneration flue gas are reduced to produce an elemental sulfur, nitrogen and water vapor. The resulting elemental sulfur is recovered in the subsequent procedure of recovering the energy in the regeneration flue gas. Therefore the subsequent sulfur-removal of the sulfur-containing flue gas to remove sulfur oxides and nitrogen oxides can be omitted, the procedure of treating the pollutants from the catalytic cracking plant can be simplified, and the efficiency of the sulfur-removal and nitrogen-removal of the regeneration flue gas is increased.

Figure 1:
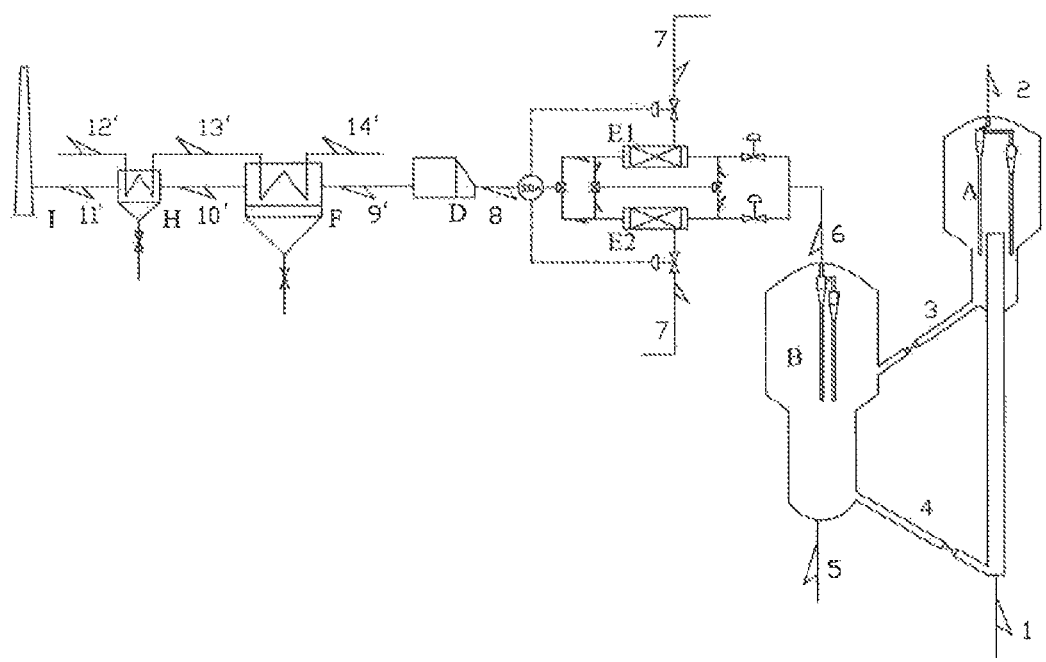
FIG. 1 is a schematic diagram for removing sulfur oxides and nitrogen oxides in the catalytic cracking regeneration flue gas according to the present invention.

A—the riser reactor in the catalytic cracking plant;
B—the regenerator of the catalytic cracking plant;
C—the high-temperature zone reactor;
D—the flue gas turbine expander;
E—the mid-temperature zone reactor;
G—the low-temperature zone reactor;
F—the waste heat boiler;
H—the cooler;
I—the chimney
3—the spent catalyst conveying line (standpipe);
4—the regenerated catalyst conveying line; and
1, 2, 5, 6, 7, 8, 9, 10, 11, 12, 13, 14, 15, 16, 9', 10', 11', 12', 13' and 14'—pipelines.

PREFERRED EMBODIMENTS OF THE INVENTION

As used herein, the term "the high-temperature zone reactor" means a reactor operated at 620° C.-690° C.

As used herein, the term "the mid-temperature zone reactor" means a reactor operated at 500° C.-650° C., In the case that the mid-temperature zone reactor and the high-temperature zone reactor are used in series, the term "mid-temperature zone reactor" means a reactor operated at 500° C.-550° C.

As used herein, the term "the low-temperature zone reactor" means a reactor operated at 150-280° C.

As used herein, the term "the catalyst loaded in the high-temperature zone reactor" (herein also referred to as "the high-temperature redox catalyst") means a catalyst of a noble metal active component and a rare earth metal active component on an inorganic oxide support. Said noble metal active component is one or more selected from the group consisting of Pt, Pd, Rh and Au, preferably one or more of Pt, Pd and Rh. Said rare earth metal active component is one or more selected from the group consisting of La, Ce and Pr. Said inorganic oxide support is one or more selected from the group consisting of $Al_2O_3$, $SiO_2$, $TiO_2$ and $ZrO_2$. Based on the total weight of the catalyst, the content of the noble metal (as oxide) in the catalyst is 0.1 wt %-5 wt %, preferably 0.2 wt %-2.5 wt %, the content of the rare earth metal (as oxide) in the catalyst is 0.2 wt %-15 wt %, preferably 0.5 wt %-10 wt %. For example, Pt is calculated as PtO, Pd is calculated as PdO, Rh is calculated as RhO, Au is calculated as AuO, La is calculated as $La_2O_3$, Ce is calculated as $Ce_2O_3$, and Pr is calculated as $Pr_2O_3$. The operation temperature of the high-temperature redox catalyst is for example 620-690° C.

As used herein, the term "the catalyst loaded in the mid-temperature zone reactor" (herein also referred to as "the mid-temperature redox, catalyst") means a catalyst of a rare earth metal and an optional transition metal active component on an inorganic oxide support, wherein said rare earth metal is one or more selected from the group consisting of La, Ce and Pr; said transition metal is one or more selected from the group consisting of Fe, Co, Ni, Cu, Zn, Ti, Mo and W; and said inorganic oxide support can be one or more of $Al_2O_3$, $SiO_2$, $TiO_2$, $ZrO_2$, $SnO_2$ and/or molecular sieve (e.g. ZSM-5, HZSM-5, NaY, mordenite and the like), preferably one or more of $Al_2O_3$, $TiO_2$, SiG) and $ZrO_2$. Based on the total weight of the catalyst, the content of the rare earth metal (as oxide) is 0.2 wt %-16 wt %, e.g. 0.2 wt %-15 wt %, 0.5 wt %-12 wt %, or 0.5 wt %-10 wt %; the content of the transition metal (as oxide) is 0.2 wt %-25 wt %, preferably 1.0 wt %-18 wt %. For example, La is calculated as $La_2O_3$, Ce is calculated as $Ce_2O_3$, Pr is calculated as $PnO_3$, Fe is calculated as $Fe_3O_4$, Co is calculated as $CO_2O_3$, Ni is calculated as $Ni_2O_3$, Cu is calculated as CuO, Zn is calculated as ZnO, Ti is calculated as $TiO_2$, Mo is calculated as $Mo_2O_3$, and W is calculated as $W_2O_3$. The operation temperature of the mid-temperature redox catalyst is lower than that of the high-temperature redox catalyst, and is for example 500-550° C. The mid-temperature redox catalyst can also be used in a broader temperature range, such as 500-650° C., or 600-650° C.

As used herein, the term "the catalyst loaded in the low-temperature zone reactor" (herein also referred to as "the low-temperature redox catalyst") means an inorganic metal oxide, which is one or more selected from the group of alumina (such as activated alumina), zirconia, titanic, and zinc oxide. The operation temperature of the low-temperature redox catalyst is lower than that of the mid-temperature redox catalyst, and is for example 150-280° C.

As used herein, the term "the high-temperature flue gas" can be a high-temperature regeneration flue gas, for example, a high-temperature regeneration flue gas from the catalytic cracking reaction (herein also referred to as "the catalytic cracking regeneration flue gas" or "the regeneration flue gas").

In a catalytic cracking reaction, a heavy hydrocarbon feedstock is introduced into a catalytic cracking reactor, and contacted and reacted with a hot regenerated catalytic cracking catalyst. The resulting hydrocarbon product and the catalyst are subjected to a gas-solid separation. The hydrocarbon product is introduced to a fractionating column of the catalytic cracking plant to produce dry gas, liquefied gas, gasoline, diesel and the like, wherein the dry gas contains $H_2$, small molecule hydrocarbon and non-hydrocarbon compounds, $H_2S$ and the like. The coked spent catalyst and a gas containing oxygen are reacted in a catalytic cracking regenerator to burn off the coke in/on the catalyst and obtain a regenerated catalyst having a recovered activity and a high-temperature regeneration flue gas. The regenerated catalyst is sent back to the catalytic cracking reactor for recycled use. The regeneration flue gas contains sulfur oxides ($SO_3$, $SO_2$), nitrogen oxides (NO, $NO_2$), carbon oxides (CO, $CO_2$), oxygen, nitrogen, water vapor and the like. The contents by volume percent of oxygen and carbon monoxide can vary depending on the catalytic cracking condition and the regeneration condition.

In all of the following embodiments, it is preferable that the high-temperature flue gas is a high-temperature regeneration flue gas coming from a catalytic cracking plant.

According to an embodiment, the present invention provides a method of removing sulfur oxides, nitrogen oxides and carbon monoxide in a high-temperature flue gas, which method is accomplished in the following manner. The high-temperature regeneration flue gas emitted from the regeneration flue gas outlet on top of the catalytic cracking regenerator is introduced into a mid-temperature zone reactor, in which a mid-temperature redox catalyst is loaded. The mid-temperature redox catalyst is preferably a catalyst of a rare earth metal active component and an optional transition metal active component on an inorganic oxide support. The regeneration flue gas, which has been optionally subjected to a dust-removal treatment, is sent to a catalyst bed of the catalytic reactor, and a reductive gas is also sent to the catalyst bed of the reactor, so that sulfur oxides, nitrogen oxides and oxygen in the regeneration flue gas and carbon monoxide in the regeneration flue gas and the reductive gas are subjected to a redox reaction at 500-650° C., preferably 600-650° C. to produce an elemental sulfur, nitrogen and water vapor; the mixed flue gas after the redox reaction containing the elemental sulfur is subjected to an optional dust-removal treatment and sent to an energy recovering system, and after being cooled down, the elemental sulfur is recovered in a liquid sulfur collector and a solid sulfur collector which are disposed at low-temperature sites. The resulting regeneration flue gas, from which sulfur oxides, nitrogen oxides and carbon monoxide have been removed, is emitted to the environment.

In the above embodiment, it is preferable that during the procedure of treating the regeneration flue gas, a flue gas turbine expander is provided to recover heat energy. The mid-temperature zone reactor is disposed before the flue gas turbine expander. The high-temperature flue gas, which has been optionally subjected to a dust-removal treatment, is sent to the reactor, and the reductive gas is also sent to the reactor, so that sulfur oxides, nitrogen oxides and oxygen in the high-temperature flue gas and carbon monoxide in the high-temperature flue gas and the reductive gas are subjected to a redox reaction to produce a mixed flue gas containing a gaseous elemental sulfur, nitrogen and water vapor. The resulting mixed flue gas is sent to the flue gas turbine expander. The reductive gas is added in an amount sufficient to completely consume the oxygen in the high-temperature flue gas.

According to another embodiment, the method of the present invention comprises: a high-temperature zone reactor is disposed after the regeneration flue gas outlet on top of the catalytic cracking regenerator. The high-temperature zone reactor is loaded with a high-temperature redox catalyst. The high-temperature redox catalyst is a catalyst of a noble metal active component and a rare earth metal active component on an inorganic oxide support. The regeneration flue gas, which has been optionally subjected to a dust-removal treatment, is sent to the high-temperature zone reactor, and the reductive gas is also sent to the reactor, Sulfur oxides, nitrogen oxides and oxygen in the flue gas and the reductive gas are subjected to a redox reaction at 620-690° C. in the catalyst bed to produce a gaseous elemental sulfur, nitrogen and water vapor, Here, it is allowable that the oxidative compounds except oxygen are in excessive amounts. The mixed flue gas, containing the gaseous sulfur after the reaction, is sent to a mid-temperature zone reactor. The mid-temperature zone reactor is loaded with a mid-temperature redox catalyst. The mid-temperature redox catalyst can be a catalyst of a rare earth metal active component on an inorganic oxide support, or a catalyst of a rare earth metal active component and a transition metal active component on an inorganic oxide support. The reductive gas is also sent to the mid-temperature zone reactor, Sulfur oxides, nitrogen oxides and carbon monoxide in the mixed flue gas and the exogenous hydrogen sulfide, hydrogen and small molecule hydrocarbons are subjected to a redox reaction at 500-550° C. to produce a gaseous elemental sulfur, nitrogen and water vapor.

In the above embodiment, it is preferable that a flue gas turbine expander is provided after the high-temperature zone reactor to recover heat energy. The mixed flue gas from the high-temperature zone reactor is sent to the flue gas turbine expander to recover heat energy. In the case that the mixed flue gas leaving the flue gas turbine expander contains an oxidative compound except oxygen, such as sulfur oxides and nitrogen oxides, the mixed flue gas leaving the flue gas turbine expander and the reductive gas are sent to the mid-temperature zone reactor to be subjected to a redox reaction and produce a mixed flue gas containing a gaseous elemental sulfur, nitrogen and water vapor. The mixed flue gas leaving the flue gas turbine expander or the mid-temperature zone reactor is sent to an energy recovering system, and after being cooled down, the elemental sulfur is recovered in a liquid sulfur collector and a solid sulfur collector which are disposed at low-temperature sites.

Accordingly, in a preferable embodiment of the present invention, the present invention provides a method of removing sulfur oxides, nitrogen oxides and carbon monoxide in a high-temperature flue gas, which method is accomplished in the following manner. A mid-temperature zone reactor is disposed before or after a flue gas turbine expander, preferably before the flue gas turbine expander. The mid-temperature zone reactor is loaded with a mid-temperature redox catalyst. The high-temperature flue gas, which has been optionally subjected to a dust-removal treatment, is sent to the mid-temperature zone reactor or sent through the flue gas turbine expander and then to the mid-temperature zone reactor, and a reductive gas is also sent to the reactor, so that sulfur oxides, nitrogen oxides and oxygen in the high-temperature flue gas and carbon monoxide in the high-temperature flue gas and the reductive gas are subjected to a redox reaction at 500-650° C., preferably 600-650° C. to produce a mixed flue gas containing the elemental sulfur, nitrogen and water vapor. After being subjected to an optional dust-removal treatment, the mixed flue gas containing the gaseous elemental sulfur, nitrogen and water vapor is sent to the flue gas turbine expander and then to an energy recovering system containing a waste heat boiler, or directly sent to an energy recovering system containing a waste heat boiler, and after being cooled down, the elemental sulfur is recovered in a liquid sulfur collector and a solid sulfur collector which are disposed at low-temperature sites, Preferably, the high-temperature flue gas is a regeneration flue gas emitted from a catalytic cracking regenerator.

Accordingly, in another preferable embodiment of the present invention, the present invention provides a method of removing sulfur oxides, nitrogen oxides and carbon monoxide in a high-temperature flue gas, which method is accomplished in the following manner. A high-temperature zone reactor is disposed before a flue gas turbine expander. The high-temperature flue gas, which has been optionally subjected to a dust-removal treatment, is sent to the high-temperature zone reactor, and a reductive gas is also sent to the reactor. Sulfur oxides, nitrogen oxides and oxygen in the high-temperature flue gas and the reductive gas are subjected to a redox reaction at 620-690° C. to produce a gaseous elemental sulfur, nitrogen and water vapor. Here, it is allowable that the oxidative compounds except oxygen are in excessive amounts. The mixed flue gas, containing the gaseous sulfur after the reaction, is sent to the flue gas turbine expander. A mid-temperature zone reactor is disposed between the flue gas turbine expander and a waste heat boiler. A reductive gas is sent to the mid-temperature zone reactor, and a mixed flue gas leaving the flue gas turbine expander is also sent to the mid-temperature zone reactor. Sulfur oxides, nitrogen oxides and carbon monoxide in the mixed flue gas free of oxygen and an additional reductive gas such as hydrogen sulfide, hydrogen and small molecule hydrocarbons are subjected to a redox reaction at 500-550° C. to produce a gaseous elemental sulfur, nitrogen and water vapor. The mixed flue gas, after leaving the mid-temperature zone reactor, is sent to the waste heat boiler to recover heat energy and a liquid sulfur. The waste heat boiler has an outlet temperature of 180-300° C., preferably 180-220° C. Then the mixed flue gas is sent to a cooler to be cooled to 100-110° C., and a solid sulfur is recovered therefrom. Preferably, the high-temperature flue gas is a regeneration flue gas emitted from a catalytic cracking regenerator.

In the above two preferable embodiments, a low-temperature zone reactor can be disposed after the waste heat boiler to treat sulfur oxides contained in the mixed flue gas that does not meet the emission requirement. The low-temperature zone reactor is operated at 150-280° C., preferably at 150-250° C., more preferably at 150-200° C. Sulfur oxides remained in the mixed flue gas and an exogenous reductive gas such as hydrogen sulfide and hydrogen are subjected to a redox reaction to produce a liquid elemental sulfur and water vapor. Here, the sulfur oxides are controlled to an excessive amount but should be kept in an amount meeting the emission requirement. The mixed flue gas after reaction is sent to a solid sulfur collector to recover the elemental sulfur.

The reductive gas and the flue gas are contacted in the catalyst beds being in different temperature zones, so that sulfur oxides, nitrogen oxides and optionally oxygen in the flue gas and the reductive gas are contacted and reacted to produce the elemental sulfur, and the sulfur is recovered in the subsequent energy recovering procedure of the mixed flue gas. In this way, the subsequent sulfur-removal of the sulfur-containing flue gas can be omitted.

According to a method of the present invention, the reactors disposed in different temperature zones, i.e. the high-temperature zone reactor, the mid-temperature zone reactor, and the low-temperature zone reactor are all in the form of bed reactor, can be in the form of a fluidized bed, a bubbling bed and as fixed bed, preferably a fixed bed, including a stacked fixed bed and a honeycomb-like fixed bed.

According to a method of the present invention, the order of sending the high-temperature flue gas and the reductive gas to the reactor is not particularly limited. For example, it is possible to send the high-temperature flue gas firstly and then the reductive gas to the reactor; or it is possible to send the reductive gas firstly and then the high-temperature flue gas to the reactor; or it is also possible to send both of them simultaneously.

According to a method of the present invention, the reductive gas can also be introduced in the proximity of the high-temperature flue gas outlet of the plant producing the high-temperature flue gas, so that the reductive gas can be carried into the high-temperature zone reactor and/or the mid-temperature zone reactor along with the high-temperature flue gas. For example, in the case of the high-temperature regeneration flue gas of the catalytic cracking reaction, the reductive gas can be introduced into the top of the regenerator.

The catalyst loaded in the reactor can be one catalyst having the above-mentioned components, or can be more than one catalysts having the above-mentioned components and being arranged in beds. The main function of the catalyst is to achieve the consumption of oxygen in the flue gas and achieve the partial or complete oxidation of the exogenous reductive gas and the partial reduction of sulfur oxides and nitrogen oxides in the presence of steam.

According to a method of the present invention, the redox catalysts loaded in the high-temperature zone reactor and the mid-temperature zone reactor are those that can catalytically reacting sulfur oxides and nitrogen oxides with the reductive gas in the presence of steam, but the redox catalyst loaded in the high-temperature zone reactor are different in type from that loaded in the mid-temperature zone reactor.

According to a method of the present invention, it is preferable to use two or more than two reactors of the same type and connected in parallel. By switching to use different reactor(s), the pre-activation of the catalyst, the reaction with the catalyst, the regeneration of the catalyst and the like are completed so that the whole redox procedure of the nitrogen-removal and the sulfur-removal can be continuously conducted.

According to a method of the present invention, the reductive gas is one or more of hydrogen, carbon monoxide, hydrogen sulfide and small molecule hydrocarbon(s) having the carbon number of 5 or less. Said small molecule hydrocarbon(s) having the carbon number of 5 or less comprises methane, ethane, ethylene, propane, butane, pentane and various isomers thereof. The reductive gas preferably contains 0.01-90 vol % of hydrogen sulfide, more preferably 0.05-80 vol % of hydrogen sulfide. The total feeding rate of the reductive gas(s) is determined with reference to the concentrations of sulfur oxides, nitrogen oxides and oxygen in the high-temperature flue gas. Generally, the high-temperature flue gas is used in a small excessive amount. The degree of the excessive amount is determined with reference to the controlled concentration of the residual target pollutant. Preferably; in case that the high-temperature flue gas is a catalytic cracking regeneration flue gas, the reductive gas comprises or is a dry gas produced from a catalytic cracking process.

According to a method of the present invention, it is preferable that a dry gas fraction from a fractionating column of a catalytic cracking plant is used as reductive gas and introduced to a reactor in which the redox reaction is conducted, wherein a part of or all of the dry gas fraction can be introduced to the reactor so that the flue gas and the dry gas are contacted in the catalyst bed; the oxygen-containing compounds in the flue gas such as sulfur oxides, nitrogen oxides and oxygen and carbon monoxide in the flue gas and hydrogen sulfide, hydrogen and small molecule hydrocarbons in the dry gas are subjected to a redox reaction to produce a gaseous elemental sulfur, nitrogen and water vapor. The use of the dry gas fraction from the catalytic cracking fractionating column as reductive gas can simultaneously remove hydrogen sulfide in the dry gas and sulfur oxides, nitrogen oxides and carbon monoxide in the regeneration flue gas, and recover the sulfur in two streams. The advantage of this embodiment lies in that one waste substance can be treated with another waste substance, and the procedure of treating the pollutants from the catalytic cracking plant can be simplified.

According to a method of the present invention, a mixed flue gas resulting from the reaction between the high-temperature flue gas and the reductive gas contains a elemental sulfur, which needs to be cooled and recovered. The process of cooling and recovering the elemental sulfur is combined with the energy recovering system of the high-temperature flue gas.

According to the present invention, the energy recovering system comprises a waste heat boiler and an optional cooler. In the case that the energy recovering system comprises the cooler, a redox reactor, such as a low-temperature redox reactor, can be disposed between the waste heat boiler and the cooler.

For example, in an energy recovering system, a mixed flue gas containing a gaseous sulfur resulting from the reaction in the high-temperature zone reactor or the mid-temperature zone reactor is introduced to a flue gas turbine expander; the mixed flue gas leaving the flue gas turbine expander outlet is then introduced to a waste heat boiler to produce a superheated water vapor, a liquid sulfur recovery device is additionally disposed in the waste heat boiler or after the waste heat boiler; a mixed flue gas leaving the waste heat boiler is introduced into a cooler to pre-heat a water coming into the waste heat boiler, and a solid sulfur recovery device is disposed in the cooler or after the cooler. More specifically, the inlet temperature of the flue gas turbine expander is e.g. 630-680° C., and the outlet temperature of the flue gas turbine expander is e.g. 520-550° C.; the inlet temperature of the waste heat boiler is lower than the outlet temperature of the flue gas turbine expander and is e.g. 500-530° C.; the outlet temperature of the waste heat boiler is 180-220° C.; the outlet temperature of the cooler is about 110° C. in the procedure of introducing the mixed flue gas to the waste heat boiler to produce a superheated water vapor, the elemental sulfur will be liquefied, and therefore a liquid sulfur recovery device is additionally disposed in the waste heat boiler or after the waste heat boiler. The water introduced into the waste heat boiler is pre-heated in the cooler, and therefore the elemental sulfur will be solidified. Accordingly, a solid sulfur recovery device is disposed in the cooler or after the cooler.

For example, in another energy recovering system, the mixed flue gas containing a gaseous sulfur leaving a high-temperature zone reactor is introduced to a flue gas turbine expander; the mixed flue gas leaving the outlet of the flue gas turbine expander is then introduced into a mid-temperature zone reactor and then into a waste heat boiler to produce a superheated water vapor, and a liquid sulfur recovery device is additionally disposed in the waste heat boiler or after the waste heat boiler; the mixed flue gas introduced from the waste heat boiler is optionally introduced to a low-temperature zone reactor, and a sulfur recovery device can be disposed in the reactor; then the mixed flue gas is introduced to a cooler to pre-heat the water introduced into the waste heat boiler, and a solid sulfur recovery device is disposed in the cooler. Said liquid sulfur recovery device is the cooling section of the waste heat boiler. The solid sulfur recovery device is a sulfur container. More specifically, the flue gas turbine expander has an inlet temperature of 600-680° C., and an outlet temperature of 510-550° C.; the waste heat boiler has an inlet temperature of 500-530° C., and an outlet temperature of 180-300° C., wherein the elemental sulfur will be liquefied in this section, and therefore a liquid sulfur recovery device is disposed after the waste heat boiler or in the waste heat boiler; then the mixed flue gas is optionally introduced to a low-temperature zone reactor to contact and react with the exogenous reductive gas, and a sulfur recovery device can be disposed in this reactor; the mixed flue gas introduced from the waste heat boiler and from the low-temperature zone reactor is introduced into a cooler to pre-heat the water introduced into the waste heat boil. The cooler has an outlet temperature of about 110° C. A solid sulfur recovery device is disposed after the cooler to recover the solid sulfur. The mixed flue gas leaving the cooler is consistent with the emission regulation.

According to a method of the present invention, it is preferable to use a high-temperature regeneration flue gas from the catalytic cracking plant. Said catalytic cracking plant comprises a catalytic cracking reactor, a fractionating column, a catalyst regenerator and other accessory structures. The catalyst used in the catalytic cracking plant can be a silica-alumina catalyst, a catalytic cracking catalyst containing molecular sieves and/or a catalytic cracking catalyst containing molecular sieve and metal oxide. These catalytic cracking catalysts are well known by those skilled in the art. The spent catalyst refers to a catalyst, which is deactivated or partially deactivated due to the reaction with hydrocarbons in the catalytic cracking reactor and needs to be regenerated. The spent catalyst has a coke content of 0.8-1.2 wt %, The spent catalyst is introduced into a regenerator. The coke, which is deposited in/on the catalyst in the reaction, is burned off in the regenerator to recover the catalytic ability of the spent catalyst and to produce a regenerated catalyst, and the produced heat energy is supplied to the catalytic cracking reactor. The regenerated catalyst has a coke content of generally 0.8 wt % or less, preferably 0.01-0.2 wt %.

The specific embodiments of the methods according to the present invention will be further illustrated with reference to the drawings, however it should be understood that the scope of the present invention is not limited thereby.

As shown in FIG. 1, a heavy hydrocarbon is introduced through a pipeline 1 into a riser reactor A to contact with a hot regenerated catalyst; after the catalytic cracking reaction, the produced hydrocarbons and the catalyst are sent from the outlet of the riser reactor A to a gas-solid separation system. The separated hydrocarbons, after the dust-removal with a cyclone, are sent through an outlet pipeline 2 to a subsequent separation system to conduct the separation (not shown). The separated catalyst is stripped and sent through the spent catalyst standpipe 3 to the catalyst regenerator B, In the catalyst regenerator B, the spent catalyst and the main air from pipeline 5 are subjected to combustion and regeneration. The regenerated catalyst is sent through the regeneration standpipe 4 back to the bottom of the riser reactor A. The regeneration flue gas containing sulfur oxides, nitrogen oxides, excessive oxygen, carbon monoxide and the like is gathered at the top of the regenerator, and introduced from the regenerator through pipeline 6 to the redox reactor such as the mid-temperature zone reactor.

Two mid temperature zone reactors in parallel are disposed between the outlet of regenerator B and the flue gas turbine expander D: the first mid-temperature zone reactor E1 and the second mid-temperature zone reactor E2. The pre-activation of the catalyst, the reaction with the catalyst, the regeneration of the catalyst and the like in the reactors are completed by the combination of switching, opening/closing and the like of the two-way valves and three-way valves between, before and after the first mid-temperature zone reactor E1 and the second mid-temperature zone reactor E2.

A reductive gas is introduced through pipeline 7 to the first mid-temperature zone reactor E1 or the second mid-temperature zone reactor E2; and the reductive gas and the regeneration flue gas are contacted in the catalyst bed of the reactor and subjected to a redox reaction to produce a gaseous elemental sulfur.

An on-line analyzer is installed on pipeline 8 after the reactor(s) to analyze the content of sulfur oxides in the going-through gas stream and control the addition amount of the reductive gas in combination with the controlling valves in the reductive gas pipeline 7.

After the on-line analyzer, the mixed flue gas is sent to a flue gas turbine expander D; then sent to a waste heat boiler F through pipeline 9', wherein a liquid sulfur recovery device is additionally disposed in the waste heat boiler F; then the flue gas is sent to a cooler H through pipeline 10', wherein a solid sulfur recovery device is additionally disposed in the cooler H; and a low-temperature flue gas from the cooler H is sent through pipeline 11' to chimney I.

The cooling water required by the cooler H is sent to the cooler H through pipeline 12' and then to the waste heat boiler F through pipeline 13', and the produced superheated steam is exported through pipeline 14'.

Figure 2:
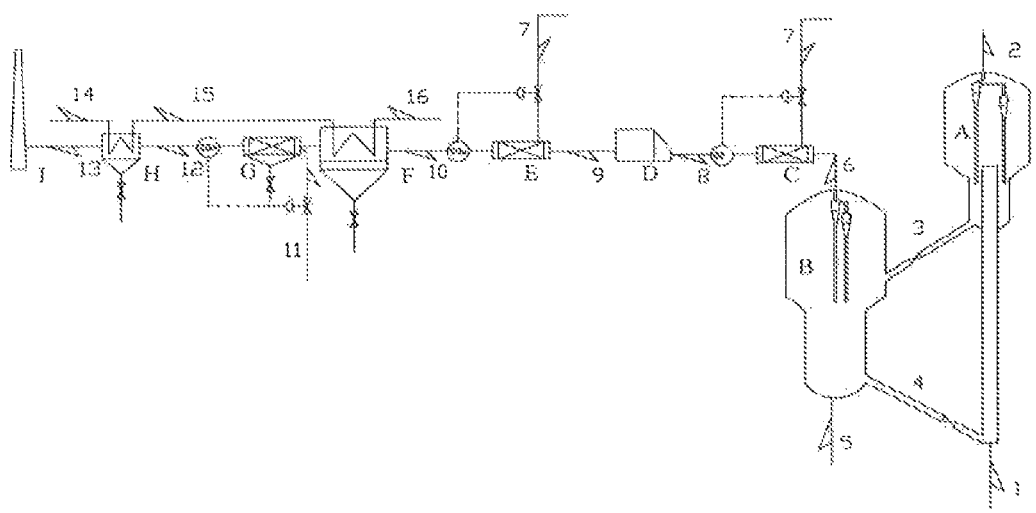
FIG. 2 is another schematic diagram tbr removing sulfur oxides and nitrogen oxides in the catalytic cracking regeneration flue gas according to the present invention, in which the symbols have the following means.

As shown in FIG. 2, a hydrocarbon is introduced through a pipeline 1 into a riser reactor A to contact with a hot regenerated catalyst; after the catalytic cracking reaction, the produced hydrocarbons and the catalyst are sent from the outlet of the riser reactor A to a gas-solid separation system. The separated hydrocarbons, after the dust-removal with a cyclone, are sent through an outlet pipeline 2 to a subsequent separation system to conduct the separation (not shown). The separated catalyst is stripped and sent through the spent catalyst standpipe 3 to the catalyst regenerator B. In the catalyst regenerator B, the spent catalyst and the main air from pipeline 5 are subjected to combustion and regeneration. The regenerated catalyst is sent through the regeneration standpipe 4 back to the bottom of the riser reactor A, The regeneration flue gas containing sulfur oxides, nitrogen oxides, carbon monoxide, excessive oxygen and the like is gathered at the top of the regenerator, and introduced from the regenerator through pipeline 6 to the high-temperature zone reactor C.

The reductive gas is introduced through pipeline 7 to the high-temperature zone reactor C; the reductive gas and the regeneration flue gas are contacted in the catalyst bed of the high-temperature zone reactor C and subjected to a redox reaction to produce a gaseous elemental sulfur. An on-line analyzer is installed on the flue gas outlet pipeline 8 to control the addition amount of the reductive gas in combination with the controlling valves of the reductive gas.

After the on-line analyzer, the mixed flue gas is sent to a flue gas turbine expander D; then sent to a mid-temperature zone reactor E through pipeline 9 to contact and react with the reductive gas from pipeline 7 to produce a gaseous elemental sulfur. An on-line analyzer is installed on the flue gas outlet pipeline 10 to control the addition amount of the reductive gas in combination with the controlling valves of the reductive gas.

After the on-line analyzer, the mixed flue gas is sent to a waste heat boiler F through pipeline 10, wherein a liquid sulfur recovery device is additionally disposed in the waste heat boiler F; then the mixed flue gas is sent to a low-temperature zone reactor G, in which the reductive gas from pipeline 11 and the mixed flue gas are contacted and reacted in the catalyst bed to produce an elemental sulfur, a sulfur recovery device is additionally disposed in the low-temperature zone reactor G. An on-line analyzer is used to control the addition amount of the reductive gas in combination with the controlling valves of the reductive gas.

Afterwards, the mixed flue gas is introduced to a cooler H through pipeline 12, and a solid sulfur recovery device is additionally disposed in the cooler H; the low-temperature flue gas from the cooler H, meeting the emission standard, is sent through pipeline 13 to chimney I.

The cooling water is sent to the cooler H through pipeline 14 and then to the waste heat boiler F through pipeline 15, and the superheated steam produced in the waste heat boiler F is exported through pipeline 16.

EXAMPLES

The following examples will further illustrate the present invention, but are not intended to limit the scope of the invention. The catalysts used in Examples are prepared by the following processes:

(1) Redox Catalyst C

Step (1): pseudoboehmite ($Al_2O_3 \cdot H_2O$) was placed in a baker. $Ce(NO_3)_3$, $ZrO(NO_3)_2$, and $Co(NO_3)_2 \cdot 6H_2O$ were formulated into an aqueous solution, which was added dropwise to pseudoboehmite to prepare a slurry, wherein pseudoboehmite, $Ce(NO_3)_3$, $ZrO(NO_3)_2$ and $Co(NO_3)_2 \cdot 6H_2O$ were in a mass ratio of m(Al):m(Ce):m(Zr):m(Co)=73:5:10:12, The slurry was stirred and aged for 2 hrs. Afterward, a suitable amount of sesbania was added to form a semi-solid, which was further extruded into cylindrical bars of Φ1 mm. The cylindrical bars were dried at 110° C., calcined at 700° C. for 5 hrs and cut into column-shape granulates of Φ1×2 mm for use.

Step (2): The support obtained in step (1) was impregnated with an aqueous $La(No_3)_3 \cdot 6H_2O$ solution twice, each impregnation was accompanied by being dried at 110° C. and being calcined at 650° C. for 5 hrs; the resulting support was further impregnated with $Mo(NO_3)_3 \cdot 5H_2O$, each impregnation was accompanied by being dried at 110° C. and being calcined at 650° C. for 5 hrs to produce Catalyst C. Based on the total weight of the catalyst, the content of $Ce_2O_3$ was 12.89 wt %, the content of $ZrO_2$ was 9.68 wt %, the content of $CoO_2$ was 8.57 wt %, the content of $La_2O_3$ was 4.6 wt %, the content of $Mo_2O_3$ was 4.2 wt %, and the balance was $Al_2O_3$. Prior to use, the catalyst was pre-activated for 2 hrs at the reaction temperature in an atmosphere containing $SO_2$, NO, CO, $H_2$, $N_2$ and the like.

(2) Redox Catalyst A and B

Step (1): $Al_2O_3 \cdot H_2O$ (pseudoboehmite), $Ce(NO_3)_3$, and $ZrO(NO_3)_2$, in a mass ratio of m(Al):m(Ce):m(Zr)=85:5:10, were placed in a baker. The deionized water was added to the baker to prepare a slurry. The slurry was stirred and aged for 2 hrs. Afterward, a suitable amount of sesbania was added to form a semi-solid, which was further extruded into cylindrical bars of Φ1 mm. The cylindrical bars were dried at 110° C., calcined at 700° C. for 4 hrs and cut into column-shape granulates of Φ1×2 mm for use.

Step (2): The support obtained in step (1) was impregnated with an aqueous $H_2PtCL_6 \cdot 6H_2O$ solution twice, each impregnation was accompanied by being dried at 110° C. and being calcined at 650° C. for 4 hrs to produce Catalyst A. Based on the total weight of the catalyst, catalyst A had a $Ce_2O_3$ content of 14.16 wt %, a $ZrO_2$ content of 0.63 wt %, a PtO content of 0.40 wt %, and the balance of $Al_2O_3$. Prior to use, the catalyst was pre-reduced at the reaction temperature in an atmosphere of $H_2$ for half an hour.

The support obtained in step (1) was impregnated with an aqueous $La(NO_3)_3 \cdot 6H_2O$ solution twice, each impregnation was accompanied by being dried at 110° C. and being calcined at 650° C. for 4 hrs to produce Catalyst B. Based on the total weight of the catalyst, catalyst B had a $Ce_2O_3$ content of 13.21 wt %, a $ZrO_2$ content of 9.92 wt %, a $La_2O_3$ content of 7.1 wt %, and the balance of $Al_2O_3$. Prior to use, the catalyst was pre-activated at the reaction temperature in an atmosphere containing $SO_2$, NO, CO, $N_2$ and the like for two hours.

In the catalyst preparation, the used pseudoboehmite was obtained from Aluminum Corporation of China, Shandong Branch; $Ce(NO_3)_3$, $Co(NO_3)_2.6H_2O$, $La(NO_3)_3.6H_2O$, $ZrO(NO_3)_2$, $Mo(NO_3)_3.5H_2O$, and $H_2PtCt_6.6H_2O$ were analytic, pure, and obtained from Sinopharm Chemical Reagent Beijing Co. Ltd.; and sesbania was obtained from Xihuayi Beijing Technology Co., Ltd.

The component contents of the mixed gas and the reaction tail gas were determined with GC-MS.

Example 1

This example was conducted in a lab-scale reactor. A quartz continuously flowing fixed bed reactor (Φ20×600 mm) was used. The reactor was loaded with 5.0 g of Catalyst C. The temperature in the reactor was controlled by heating with a three-section electrical furnace. The first section and the last section of the reactor were loaded with quartz sand, and the middle section of the reactor was loaded with the catalyst bed. A feedstock gas, i.e. a mixed gas of a catalytic cracking regeneration flue gas and a reductive gas, was introduced to the reactor with a gas flow rate of 3000 ml/min. The mixed gas was passed through the catalyst bed in the middle of the reactor to conduct the reaction. The drawn-out gas after reaction was a reaction tail gas. The contents of components in the mixed gas and the reaction tail gas were determined with GC-MS.

For simulating a catalytic cracking regeneration flue gas, a flue gas having the following composition was formulated: 5.357 vol % $O_2$, 0.107 vol % CO, 17.143 vol % $CO_2$, 0.214 vol % $SO_2$, 0.054 vol % NO, 0.005 vol % $NO_2$, 10.714 vol % $H_2O$ and 66.405 vol % $N_2$. The used reductive gas contained four components: 45.00 vol % $H_2$, 27.00 vol % CH4, 3.00 vol % WS, and 25.00 vol % $N_2$.

The flue gas and the reductive gas were mixed in a ratio of 14/1 v/v, and the composition of the mixed gas was shown in Table 1.

The reactions were conducted in a condition of the reaction pressure being a normal pressure and the reaction temperatures being 650° C., 600° C. and 500° C. respectively (the reactor outlet temperature). When the reaction reached the balance state, the composition of the tail gas was shown in Table 1, It could be seen from Table 1 that the reaction tail gas only contains 45 ppmv $SO_2$ at a temperature of >600° C., which was much lower than the emission standard of 190 ppmv (Ministry of Environmental Protection of the People's Republic of China "Integrated Emission Standard of Air Pollutants" GB6297-1996), Specifically; $SO_2$≤550 mg/m³.

TABLE 1

| Gas component | Content, v % Feedstock Gas | 650° C. Tail Gas | 600° C. Tail Gas | 500° C. Tail Gas |
|---|---|---|---|---|
| $H_2$ | 3.000 | 0 | 0 | 0 |
| $O_2$ | 5.000 | 0 | 0 | 1.10 |
| $CH_4$ | 1.800 | 0 | 0 | 0.60 |
| CO | 0.100 | 0 | 0 | 0.0 |
| $CO_2$ | 16.000 | 17.80 | 17.80 | 17.30 |
| $H_2S$ | 0.200 | 0 | 0 | 0.0 |
| $SO_2$ | 0.200 | 0.0045 | 0.0045 | 0.080 |
| NO | 0.050 | 0 | 0 | 0 |
| $NO_2$ | 0.005 | 0 | 0 | 0 |

TABLE 1-continued

| Gas component | Content, v % Feedstock Gas | 650° C. Tail Gas | 600° C. Tail Gas | 500° C. Tail Gas |
|---|---|---|---|---|
| $H_2O$ | 10.000 | 16.70 | 16.70 | 15.60 |
| $N_2$ | 63.645 | 65.496 | 65.496 | 65.320 |
| Total | 100.0 | 100.0 | 100.0 | 100.0 |

Example 2

This example was conducted in a lab-scale reactor. For simulating a catalytic cracking regeneration flue gas, a flue gas having the following composition was formulated: 5.357 vol % $O_2$, 0.107 vol % CO, 17.143 vol % $CO_2$, 0.214 vol % $SO_2$, 0.054 vol % NO, 0.005 vol % $NO_2$, 10.714 vol % $H_2O$ and 66.405 vol % $N_2$. The used reductive gas contained four components: 45.00 vol % $H_2$, 27.00 vol % $CH_4$, 3.00 vol % $H_2S$, and 25.00 vol % $N_2$.

The flue gas and the reductive gas were mixed in a ratio of 14/1 v/v, and the composition of the mixed gas was shown in Table 2. A mixed gas, i.e. a feedstock gas, was introduced to the reactor with a gas flow rate of 3000 ml/min.

Example 2.0

A quartz continuously flowing fixed bed reactor (Φ20×600 mm) was used. The reactor was not loaded with any catalyst, but only loaded with quartz sand.

The reaction was conducted in a condition of the reaction pressure being a normal pressure and the reaction temperature being 650° C. (the reactor outlet temperature). When the reaction reached the balance state, the composition of the tail gas was shown in Table 2.

Example 2.1

Two quartz continuously flowing fixed bed reactors (Φ20×600 mm) were used in series. Said two reactors were loaded with quartz sand at the first and the last sections and with the catalyst bed at the middle section. A feedstock gas, i.e. a mixed gas of a catalytic cracking regeneration flue gas and a reductive gas, was introduced to the first reactor with a gas flow rate of 3000 ml/min. The mixed gas was passed through the catalyst bed in the middle of the first reactor to conduct the reaction. The drawn-out gas after reaction was introduced to the second reactor, and continued to react in the catalyst bed in the second reactor. The mixed gas after reaction was drawn out of the second reactor as the reaction tail gas. The contents of components in the mixed gas and the reaction tail gas were determined with GC-MS.

The first reactor I was loaded with 5.0 g of catalyst A. The reaction in the reactor I was conducted in a condition of the reaction pressure being a normal pressure and the reaction temperature being 650° C. (the reactor outlet temperature) with a weight hourly space velocity of 48 h$^{-1}$. The second reactor II was loaded with 5.0 g of catalyst B. The reaction was conducted in a condition of the reaction pressure being a normal pressure and the reaction temperature being 500° C., When the reaction reached the balance state, the composition of the tail gas was shown in Table 2.

Example 2.2

Two quartz continuously flowing fixed bed reactors (Φ20×600 mm) were used in series. The operations were the same as those in Example 2.1. The first reactor was loaded with 5.0 g of catalyst A. The reaction in the first reactor was conducted in a condition of the reaction pressure being a normal pressure and the reaction temperature being 630° C. (the reactor outlet temperature) with a weight hourly space velocity of 48 h$^{-1}$. The second reactor II was loaded with 5.0 g of catalyst C. The reaction was conducted in a condition of the reaction pressure being a normal pressure and the reaction temperature being 520° C. When the reaction reached the balance state, the composition of the tail gas was shown in Table 2.

Example 2.3

Three quartz continuously flowing fixed bed reactors (Φ20×600 mm) were used in series. The operations were the same as those in Example 2.1 except that the mixed was after reaction drawn out of the second reactor was introduced to the third reactor to continue the reaction, and the mixed gas drawn out of the third reactor was a reaction tail gas. The first reactor was loaded with 5.0 g of catalyst A, the second reactor was loaded with 5.0 g of catalyst C, and the third reactor was loaded with small alumina spheres. The reactions were conducted in a condition of the reaction pressure being a normal pressure and the reaction temperatures being 620° C. (for the first reaction), 500° C. (for the second reaction) and 170° C. (for the third reaction) respectively (the reactor outlet temperature). When the reaction reached the balance state, the composition of the tail gas was shown in Table 2.

TABLE 2

| Gas component Content, v % | Content, v % Feedstock Gas | Ex. 2.0 Tail Gas | Ex. 2.1 Tail Gas | Ex. 2.2 Tail Gas | Ex. 2.3 Tail Gas |
|---|---|---|---|---|---|
| $H_2$ | 3.000 | 0.590 | 0 | 0 | 0 |
| $O_2$ | 5.000 | 1.381 | 0 | 0 | 0 |
| $CH_4$ | 1.800 | 0.360 | 0 | 0 | 0 |
| CO | 0.100 | 0.980 | 0 | 0 | 0 |
| $CO_2$ | 16.000 | 16.508 | 17.83 | 17.85 | 17.88 |
| $H_2S$ | 0.200 | 0.210 | 0 | 0 | 0 |
| $SO_2$ | 0.200 | 0.190 | 0.0050 | 0.0040 | 0.0012 |
| NO | 0.050 | 0.042 | 0 | 0 | 0 |
| $NO_2$ | 0.005 | 0.000 | 0 | 0 | 0 |
| $H_2O$ | 10.000 | 13.807 | 16.75 | 16.76 | 16.78 |
| $N_2$ | 63.645 | 65.932 | 65.415 | 65.386 | 65.339 |
| Total | 100.0 | 100.0 | 100.0 | 100.0 | 100.0 |

The invention claimed is:

1. A method of removing sulfur oxides and nitrogen oxides in a regeneration flue gas of a catalytic cracking regenerator, wherein said method comprises the following steps:
   (1) a mid-temperature zone reactor and a high-temperature zone reactor are provided;
   (2) a catalyst of a noble metal active component and a rare earth metal active component on an inorganic oxide support is loaded in the high-temperature zone reactor; a catalyst of a rare earth metal active component and an optional transition metal active component on an inorganic oxide support is loaded in the mid-temperature zone reactor;
   (3) the regeneration flue gas is sequentially passed through the high-temperature zone reactor and the mid-temperature zone reactor;
   (4) a reductive gas is added to the high-temperature zone reactor and the mid-temperature zone reactor, wherein the reductive gas can enter the reactor(s) prior to, simultaneously with or posterior to the flue gas; and
   (5) the flue gas and the reductive gas are reacted at 620-690° C. in the high-temperature zone reactor and the flue gas and the reductive gas are reacted at 500-550° C. in the mid-temperature zone reactor, wherein said reductive gas contains 0.01-90 vol % of hydrogen sulfide.

2. The method of claim 1, wherein the mid-temperature zone reactor, a flue gas turbine expander and the high-temperature zone reactor are provided in the step (1), the catalytic cracking regenerator, the high-temperature zone reactor, the flue gas turbine expander and the mid-temperature zone reactor, are connected in the above mentioned order, after that a waste heat boiler is optionally connected, and then a cooler is optionally connected.

3. The method of claim 2, wherein the waste heat boiler is present and a low-temperature zone reactor is disposed after the waste heat boiler and before the cooler, wherein the flue gas coming from the waste heat boiler and the reductive gas introduced into the low-temperature zone reactor are reacted at 150-250° C. in the presence of a catalyst, wherein said catalyst is one or more selected from alumina such as activated alumina, zirconia, titania and zinc oxide.

4. The method of claim 3, wherein a sulfur recovery device is disposed in said low-temperature zone reactor.

5. The method of claim 3, wherein said flue gas turbine expander has an inlet temperature of 630-680° C. and an outlet temperature of 520-550° C.; said waste heat boiler has an inlet temperature of 500-530° C. and an outlet temperature of 180-300° C.; and said cooler has an outlet temperature of 100-110° C.

6. The method of claim 3, wherein a liquid sulfur recovery device is disposed in or after the waste heat boiler; and a solid sulfur recovery device is disposed in the cooler.

7. The method of claim 1, wherein a catalyst of a noble metal active component and a rare earth metal active component on an inorganic oxide support is loaded in the high-temperature zone reactor,
   wherein said noble metal active component is one or more selected from the group consisting of Pt, Pd, Rh and Au, said rare earth metal active component is one or more selected from the group consisting of La, Ce and Pr, and said inorganic oxide support is one or more selected from the group consisting of $AlO_3$, $SiO_2$, $TiO_2$ and $ZrO_2$.

8. The method of claim 7, wherein based on the total weight of the catalyst, the content of the noble metal (as oxide) in said catalyst is 0.1 wt %-5 wt %, and the content of the rare earth metal (as oxide) in said catalyst is 0.2 wt %-15 wt %.

9. The method of claim 1, wherein a catalyst of a rare earth metal active component and an optional transition metal active component on an inorganic oxide support is loaded in the mid-temperature zone reactor, wherein said rare earth metal is one or more selected from the group consisting of La, Ce and Pr, said transition metal is one or more selected from the group consisting of Fe, Co, Ni, Cu, Zn, Ti, Mo and W, said inorganic oxide support can be one or more of $Al_2O_3$, $SiO_2$, $TiO_2$, $ZrO_2$, $SnO_2$ and molecular sieve such as ZSM-5, HZSM-5, NaY, and mordenite, preferably one or more of $Al_2O_3$, $TiO_2$, $SiO_2$ and $ZrO_2$.

10. The method of claim 9, wherein based on the total weight of the catalyst, the content of the rare earth metal (as oxide) in said catalyst is 0.2 wt %-16 wt %; and the content of the transition metal (as oxide) in said catalyst is 0.2 wt %-25 wt %.

11. The method of claim 1, wherein said reductive gas is one or more of hydrogen, hydrogen sulfide, carbon monoxide and small molecule hydrocarbon(s) having the carbon number of 5 or less.

12. The method of claim 1, wherein said reductive gas comprises or is a dry gas fraction obtained from a catalytic cracking plant.

13. The method of claim 1, wherein the number of the mid-temperature zone reactor is one or more than one, wherein in the case that the number of the mid-temperature zone reactor is more than one, said reactors are connected in parallel; and/or the number of the high-temperature zone reactor is one or more than one, wherein in the case that the number of the high-temperature zone reactor is more than one, said reactors are connected in parallel.

14. An apparatus for removing sulfur oxides and nitrogen oxides in a regeneration flue gas of a catalytic cracking plant, wherein said catalytic cracking plant comprises a catalytic cracking reactor, a regenerator and a product separation system, wherein the regenerator has a flue gas outlet, and the product separation system has a dry gas outlet; wherein said apparatus comprises a mid-temperature zone reactor, an optional flue gas turbine expander and a high-temperature zone reactor,
 wherein a catalyst of a noble metal active component and a rare earth metal active component on an inorganic oxide support is loaded in the high-temperature zone reactor;
 wherein a catalyst of a rare earth metal active component and an optional transition metal active component on an inorganic oxide support is loaded in the mid-temperature zone reactor;
 the flue gas outlet of the regenerator is connected to the high-temperature zone reactor, the inlet of the mid-temperature zone reactor is connected to the outlet of the high-temperature zone reactor; or in case that the flue gas turbine expander is present, the inlet of the mid-temperature zone reactor is connected to the outlet of the high temperature zone reactor through the flue gas turbine expander;
 wherein the high-temperature zone reactor and the mid-temperature zone reactor respectively have one or more than one reductive gas inlets, wherein the flue gas outlet of the regenerator is connected through valve(s) to one or more than one reductive gas inlets of the high-temperature zone reactor or the mid-temperature zone reactor.

15. The apparatus of claim 14, wherein said apparatus further comprises a subsequently connected waste heat boiler and optionally a cooler following the waste heat boiler.

16. The apparatus of claim 15, wherein a liquid sulfur recovery device is disposed in or after the waste heat boiler; and a solid sulfur recovery device is disposed in the cooler.

17. The apparatus of claim 14, wherein the number of the mid-temperature zone reactor is one or more than one, wherein in the ease that the number of the mid-temperature zone reactor is more than one, said reactors are connected in parallel; and/or the number of the high-temperature zone reactor is one or more than one, wherein in the case that the number of the high-temperature zone reactor is more than one, said reactors are connected in parallel.

18. The apparatus of claim 14, wherein a low-temperature zone reactor is disposed after the waste heat boiler and before the optional cooler, said low-temperature zone reactor is loaded with one or more than one catalysts selected from the group consisting of alumina such as activated alumina, zirconia, titania and zinc oxide, and said low-temperature zone reactor has one or more reductive gas inlets.

19. The apparatus of claim 18, wherein a sulfur recovery device is disposed in said low-temperature zone reactor.

* * * * *

UNITED STATES PATENT AND TRADEMARK OFFICE
CERTIFICATE OF CORRECTION

PATENT NO. : 9,266,062 B2  
APPLICATION NO. : 14/235518  
DATED : February 23, 2016  
INVENTOR(S) : Dawei Guo et al.

Page 1 of 1

It is certified that error appears in the above-identified patent and that said Letters Patent is hereby corrected as shown below:

Claims

Claim 2, col. 18, line 12, delete "," before "are connected".

Claim 17, col. 20, line 18, "wherein in the ease that the number" should read -- wherein in the case that the number --.

Signed and Sealed this  
Twelfth Day of July, 2016

Michelle K. Lee  
*Director of the United States Patent and Trademark Office*